United States Patent
Zhang et al.

(10) Patent No.: US 9,225,587 B2
(45) Date of Patent: Dec. 29, 2015

(54) MECHANISM FOR ALARM MANAGEMENT OF FEMTO RELATED SYSTEMS TO AVOID ALARM FLOODS

(75) Inventors: Yi Zhang, Beijing (CN); Wei Hua Zhou, Beijing (CN); Shun Liang Zhang, Beijing (CN); Christian Markwart, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 453 days.

(21) Appl. No.: 13/514,184

(22) PCT Filed: Dec. 10, 2009

(86) PCT No.: PCT/CN2009/001412
§ 371 (c)(1),
(2), (4) Date: Aug. 1, 2012

(87) PCT Pub. No.: WO2011/069276
PCT Pub. Date: Jun. 16, 2011

(65) Prior Publication Data
US 2012/0287773 A1   Nov. 15, 2012

(51) Int. Cl.
H04L 12/24   (2006.01)
H04L 12/26   (2006.01)
H04W 24/02   (2009.01)
H04W 8/26    (2009.01)

(52) U.S. Cl.
CPC ............. *H04L 41/06* (2013.01); *H04L 43/06* (2013.01); *H04L 43/0823* (2013.01); *H04W 24/02* (2013.01); *H04W 8/265* (2013.01)

(58) Field of Classification Search
CPC ............ H04L 43/0823; H04L 12/1895; H04L 12/2419; H04L 41/06
USPC .............. 370/221, 225, 242, 230, 216
See application file for complete search history.

(56) References Cited

U.S. PATENT DOCUMENTS

| 4,257,038 A | * | 3/1981 | Rounds et al. | 340/539.16 |
| 5,949,759 A | * | 9/1999 | Cretegny et al. | 370/250 |
| 5,995,485 A | * | 11/1999 | Croslin | 370/216 |
| 7,369,764 B1 | * | 5/2008 | Sukegawa et al. | 398/33 |

(Continued)

FOREIGN PATENT DOCUMENTS

| CN | 101014179 A | 8/2007 |
| CN | 101159634 A | 4/2008 |
| CN | 101365205 A | 2/2009 |

OTHER PUBLICATIONS

International Search Report and Written Opinion corresponding to International Application No. PCT/CN2009/001412, dated Sep. 23, 2010.

*Primary Examiner* — Raj Jain
(74) *Attorney, Agent, or Firm* — Squire Patton Boggs (US) LLP (57) ABSTRACT

A method of alarm management in a communications system having a number of Femto base stations, the method comprising the steps of: detecting disruption of a communication link between a Femto base station and a management system via which alarms are communicated; blocking the sending of alarms by the Femto base station; generating a report representative of the accumulation of alarms; detecting re-establishment of the communication link; sending the report to the management system; and reporting alarms to the management system on the basis of the report.

18 Claims, 3 Drawing Sheets

(56) References Cited

U.S. PATENT DOCUMENTS

| | | | |
|---|---|---|---|
| 8,326,666 B2* | 12/2012 | Caldwell et al. | 705/7.12 |
| 2003/0069959 A1* | 4/2003 | Tse | 709/224 |
| 2004/0111643 A1* | 6/2004 | Farmer | 713/201 |
| 2004/0204914 A1* | 10/2004 | Milland | 702/188 |
| 2009/0175166 A1* | 7/2009 | Long et al. | 370/225 |
| 2010/0103851 A1* | 4/2010 | Chintada et al. | 370/312 |
| 2012/0287773 A1* | 11/2012 | Zang et al. | 370/216 |

* cited by examiner

MECHANISM FOR ALARM MANAGEMENT OF FEMTO RELATED SYSTEMS TO AVOID ALARM FLOODS

BACKGROUND

1. Field

This invention relates to alarm management in a communications system. It is particularly, but not exclusively, related to alarm management in a mobile communications system.

2. Description of the Related Art

The amount of Internet traffic generated as a result of users having broadband connections is increasing. A significant cause of this increase is the transmission of multimedia, and in particular video.

Although broadband was originally provided via wired connections, there is a growing interest in broadband provided via wireless connections (so-called wireless broadband) and in particular in wireless mobile communication systems. As a consequence, home and office users using wireless broadband connections are becoming target customers for wireless network operators and service providers looking to increase average revenue per user and operating margin.

There are a number of different types of wireless mobile communication systems. Examples include second generation (2G) wireless mobile communication systems and more advanced systems such as third generation (3G) wireless mobile communication systems. A more advanced system than 3G, which is being developed within the 3rd Generation Partnership Project (3GPP), is referred to as long term evolution (LTE).

In one implementation, wireless broadband is provided by mobile terminals connecting to cells served by Femto base stations (Femto cells). Femto base stations are low-power wireless access points that have a cellular wireless network air interface to connect to compatible cellular mobile terminals, which are themselves connected to a mobile network operator's network using any suitable broadband connection, for example residential digital subscriber line (DSL) or cable broadband connections. As a result, the Femto base stations are connected to the core network through the Internet. In the case of 3GPP LTE networks, the Femto base stations are connected to a relevant serving gateway for data traffic and to a mobility management entity (MME) for signalling traffic through a Home eNodeB gateway or not depending on the implementation. In case of 3GPP 3G networks, the Femto base stations are connected to a Home NodeB gateway, which concentrates data and signalling traffic.

Femto base stations are essentially scaled-down versions of macro cell base stations (that is those serving conventional cells having a relatively large area which might be kilometers or tens of kilometers across). In general, Femto base stations are about the size of a WLAN access point, and provide enhanced cellular coverage to an area of about several hundred square meters. This is more than enough for small offices or homes.

In 3GPP terminology, Femto base stations, or home base stations, are called Home NodeBs or HNBs when referring to 3G applications and are called Home enhanced NodeBs or HeNBs when referring to LTE applications. The general term used to apply to both is H(e)NB. In the following, where the term "(e)" is included in the name of any network functionality, this indicates that the functionality can be applied both in 3G and LTE systems.

In functional terms, an H(e)NB comprises the combined functionality of a base station, that is a BTS/NodeB/eNodeB, and some of the functionality of a base station controlling element, that is a base station controller (BSC) or a radio network controller (RNC).

Using a Femto base station provides a capacity equivalent to a mobile network cell at low transmit powers. This may allow for increased mobile terminal battery life. In addition, mobile terminals can be simpler because they do not have to be capable of operating according to other wireless protocols, such as wireless local area network (WLAN). Using Femto base stations frees up a network operator's cellular network for other traffic and relieves congestion at cell sites. In addition, Femto cells employ a user's own power and broadband resources.

SUMMARY

In networks based on macro cells, the number of macro cell base stations connected to a management system is not particularly large. Furthermore, since such macro cell base stations are incorporated into a network according to a carefully designed network plan with central control configured from the outset, fault management is straightforward. In contrast, in networks based on Femto cell base stations (where there might also be macro cells), fault management is much more difficult to handle. Firstly, the number of Femto cell base stations in one network can be very large. For example, if there are 20,000 H(e)NBs connected to one H(e)MS, the total number of alarms to be handled can be huge. Secondly, the management of Femto cell base stations is to some degree controlled by customers/subscribers, which means that their activities may lead to an increase in the number of alarms.

These problems are compounded in the event of communication problems occurring between H(e)NBs and an associated H(e)MS. If, for example, a DSL connection is disrupted by DSL line congestion or by a security gateway being down, then it may not be possible to establish a connection between H(e)NBs and the H(e)MS. During the period that the communication link is down, an H(e)NB may generate some alarms, and those defined as expedited or queued alarms will be stored in the Queued Alarm List 218 or the Expedited Alarm List 220. As a result, the Alarm Lists may become full and earlier alarms may be overwritten before they can be transferred to the H(e)MS. After the communication link is re-established, each H(e)NB will send alarms that have been stored in the relevant Alarm Lists during the period that the communication link was down, which could potentially flood the H(e)MS with alarms and as a result interfere with its normal operation.

According to a first aspect of the invention there is provided a method of alarm management in a communications system comprising the steps of:

detecting disruption of a communication link between a node and a management system via which alarms are communicated;

blocking the sending of alarms by the node;

generating a report representative of the accumulation of alarms;

detecting re-establishment of the communication link;

sending the report to the management system; and reporting alarms to the management system on the basis of the report.

Preferably, the communications system is a mobile communications system. It may be a wireless communications system. It may be a cellular wireless network having an air interface which is capable of connecting a radio access part to compatible cellular mobile terminals. The communications system may be a third generation system or a long term evolution system.

The node may comprise a low-power wireless access point. It may be a home base station, for example a Femto base station. The node may be connected to a network operator's network via a broadband connection.

The communications system may comprise a large number of nodes. The nodes may be, at least to some extent, user-controlled. In this case, they may be susceptible to errors or failures being, at least in part, due to user behaviour.

The node may send and receive two traffic streams, a traffic stream of user voice/data traffic and signalling between itself and a core network and a traffic stream of OAM traffic between itself and the management system.

Preferably, the alarms are generated when the node detects a problem and then generates a corresponding internal alarm. The alarm may be sent to a fault management part of the node. The node may put the alarms into alarm lists. The node may comprise an alarm list of a type from which alarms are to be sent outside of the node. The node may comprise a queued alarm list and/or an expedited alarm list. The node may comprise an alarm list of a type from which alarms are not sent outside of the node. The node may comprise a current alarm list and/or a history alarm list.

The node may receive an alarm and identify the alarm to determine its type and the list into which it should go. The node may update a current alarm list with the alarm and also take appropriate action, for example report the alarm or put it into a list from which it is to be reported.

Preferably, disruption of the communication link means that alarms generated in the node cannot be sent to the management system. These alarms, or at least some of them, may be identified as alarms to be sent. They may be stored in a queued alarm list and an expedited alarm list.

After the communication link is re-established, the node may send at least some alarms that have been stored in the relevant alarm lists during the period that the communication link was disrupted.

The report may be generated in a report generation block. This may be in a fault management part of the node. The report generator block may receive a notification that there is a disruption to the communication link and respond by communicating with various alarm lists in the node and obtaining from them information which is to be used to generate the report.

The report may include information relating to the number of pending alarms which are indicated as needing to be sent to the management system. It may include information relating to the number of current alarms. It may include information relating to the number of alarms having a defined grade of severity, for example, the number of alarms identified as being "Critical", the number of alarms identified as being "Major", the number of alarms identified as being "Minor", the number of alarms identified as being "Warning", the number of alarms identified as being "Indeterminate", and the number of alarms identified as being "Cleared". It may include information relating to the number of overwritten alarms in an expedited alarm list and/or a queued alarm list.

Rather than numbers of alarms, the report may include information relating to the occupancy of alarm lists by alarms, for example in percentage terms the extent to which an expedited, a queued, and/or a current alarm list is full.

The report generation block may carry out periodic interrogations of alarm lists over the period during which the communication link was disrupted. During this time, the report generation block may produce updates of its report.

Preferably, a fault management functionality of the node applies blocking if the communication link (or connection) is disrupted. Preferably, the management system instructs unblocking. This may be done by a fault management entity of the management system. Blocking may be carried out in response to a notification that the communication link is disrupted. Blocking may involve the application of a command to the fault management part to block temporarily transfer of expedited and queued alarms until the block is removed. A list of current alarms and/or a history list of alarms may remain unblocked.

Blocking the transfer of alarms may be done before the report is generated.

Re-establishment of the communication link may be determined by an agent part of the node which then notifies the report generation block. In response, the report generation block may freeze updating of the report and may provide the frozen report to the agent part. The agent part may send the report to the management system. The management system may carry out alarm synchronisation with the node to avoid alarm information inconsistencies or alarm flooding.

Synchronisation may involve determining that there is a sufficiently small number of alarms to be reported/transferred, unblocking relevant alarms lists and sending the alarms. In the event that the number of alarms is sufficiently high, there may be a reboot or factory reset operation carried out on the node. A reboot or a factory reset operation may also unblock an expedited alarm list and/or a queued alarm list.

Synchronisation may involve checking whether any alarms, which are waiting to be sent but are blocked, have been cleared and therefore do not need to be sent. It may involve using the available information about alarms to recreate overwritten alarms.

Unblocking may take place after alarm synchronisation between the node and the management system has been carried out. In one embodiment of the invention, there is an implicit "unblocking" command which is automatically applied as a result of carrying out a reboot operation, a factory reset operation, or an alarm status synchronisation operation. In another embodiment of the invention, there is an explicit "unblocking" command which is sent and applied after a reboot operation, a factory reset operation, or an alarm status synchronisation operation.

Preferably, the node applies a block and the management system applies an unblock.

Preferably, if the report indicates that the number of alarms is not too high to handle, but there needs to be some control in transferring only the alarms which are considered to be active, synchronisation of alarms is carried out between the node and the management system. This management system may obtain a list of active alarms within the node and then handle only these alarms rather than spend transmission resources and processing resources on alarms which do not have to be processed.

The management system may instruct the node to send to it synchronisation information which will enable it to carry out the synchronisation operation. In one embodiment of the invention, this is a list of current alarms. The management system may obtain the list by using a synchronisation command. The node may receive an associated synchronisation time-stamp which represents the time to be used as the basis of synchronisation. The node may obtain the associated synchronisation time-stamp. In response to the synchronisation command, the node may provide to the management system the list in accordance with the synchronisation time-stamp. The synchronisation command may indicate to the node that it is not to send to the management system alarms in alarm lists which would otherwise be sent to the management system that have individual time-stamps earlier than the synchronisation time-stamp. The node may be configured to send alarms having individual time-stamps later than the synchronisation time-stamp when these lists are unblocked.

The management system may use the list of current alarms to compare the alarms on the list with alarms it is currently handling to identify alarms which are still active in the management system but have been cleared in the node, that is no "clearing" alarm has been received. This enables the management system re-construct "clearing" alarms which were over-written in the node. Such re-constructed "clearing" alarms can then be provided to higher level management systems which had previously been notified of alarms that they have in fact been cleared.

The invention may involve determining that the communication link is restored, sending the report to the management system, the management system checking the report, the report being sent to, and checked by, the management system, and then synchronisation being applied. Synchronisation may take a basic form based on a reboot or a factory reset, or a more complicated form involving obtaining synchronisation information which is sent to the management system. Once any necessary synchronisation operation has taken place and relevant alarm lists can be unblocked, and alarms can again be sent from these alarms lists to the management system.

Synchronisation can take a number of forms. It may involve a modest number of alarms being transferred to the management system when it sends an unblock command to the node. It may involve a number of alarms being considered to be sufficiently high that alarm recovery is not useful and the management system commanding the node to carry out a reboot or factory reset operation. If the management system decides to instruct a node to carry out a reboot or a reset operation, it may also reset the alarm status of all unresolved alarms it maintains in respect of that node. A factory reset or reboot operation may also put relevant alarm lists into an unblocked state. It may involve a number of alarms being considered not to be sufficiently high that alarm recovery is useful and transferring only those alarms which are considered to be active so that the management system handles only these alarms rather than spending transmission resources and processing resources on alarms which do not have to be processed.

The forms of synchronisation referred to in the preceding paragraph can be applied individually or in combination. For example the first and second forms can be used in combination with the first applying below a threshold and the second applying above the threshold. The third form can be applied independently or in conjunction with the first form.

The third form may be applied to mitigate the effect of over-writing of alarms in alarm lists. If the report contains fewer reports than a threshold, it may be assumed there has been no overwriting, and it is not necessary to apply the third form. In this case, relevant alarm lists may be unblocked and the alarms within sent to the management system.

The invention may apply to management of a node by a management system over an interface. It may be management of an H(e)NB over a type 1 interface by an H(e)MS.

The management system may be responsible for tasks such as configuration management, fault management, and performance management, and other OAM-related tasks.

According to a second aspect of the invention there is provided a communications system capable of managing alarms, the system comprising:

a node and a management system linked together by a communication link via which alarms are communicated, the node being capable of determining that there is disruption of the communication link, and being capable of blocking the sending of alarms, the node comprising a report generating block to generate a report representative of the accumulation of alarms, the node being capable of sending the report to the management system when it has determined that there is no longer disruption of the communication link, wherein the alarms are reported to the management system based on the report.

According to a third aspect of the invention there is provided a node capable of managing alarms in a communications system, the node being linked to a management system by a communication link via which alarms are communicated, the node being capable of determining that there is disruption of the communication link, and being capable of blocking the sending of alarms, the node comprising a report generating block to generate a report representative of the accumulation of alarms when it has determined that there is no longer disruption of the communication link, the node being capable of sending the report to the management system, wherein reporting alarms to the management system is carried out based on the report.

According to a fourth aspect of the invention there is provided a management system capable of managing alarms in a communications system, the management system being linked to a node by a communication link via which alarms are communicated, the management system being capable of receiving a report from the node when it has been determined that there is no longer disruption of the communication link, the report having been generated to indicate the accumulation of alarms, and the management system being capable of receiving alarms the reporting of which had been blocked during the disruption, wherein the alarms are reported to the management system based on the report.

According to a fifth aspect of the invention there is provided a computer program product comprising software code that when executed on a computing system performs a method of alarm management in a communications system comprising the steps of:

detecting disruption of a communication link between a node and a management system via which alarms are communicated;

blocking the sending of alarms by the node;

generating a report representative of the accumulation of alarms;

detecting re-establishment of the communication sending the report to the management system; and reporting alarms to the management system on the basis of the report.

Preferably, the computer program product has executable code portions which are capable of carrying out the steps of the method.

Preferably, the computer program product is stored on a computer-readable medium.

An aim of the invention is to avoid alarm floods and to provide a synchronised alarm status between a home base station and an associated management system. This enables the management system to perform the right action(s) once a communication problem has been resolved in order to protect the management system against alarm floods.

BRIEF DESCRIPTION OF THE DRAWINGS

An embodiment of the invention will now be described, by way of example only, with reference to the accompanying drawings in which.

DETAILED DESCRIPTION

Figure 1:
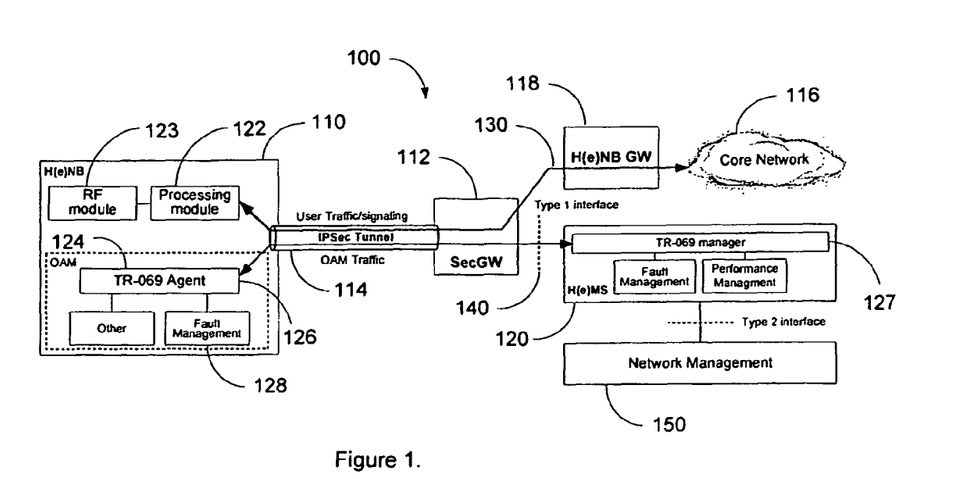
FIG. 1 shows a 3GPP Femto system architecture.

FIG. 1 shows a 3GPP Femto system architecture 100 including an Operation, Administration and Maintenance (OAM) management system. The Femto system architecture 100 is applicable both to 3G and LTE and so the terminology H(e)NB is used when referring to Femto base stations. The system architecture comprises a home base station, H(e)NB, 110, a security gateway (SecGW) 112, and an IP (Internet Protocol) security tunnel 114 linking the H(e)NB 110 to the SecGW 112. The SecGW 112 is linked in turn to a core network 116 of a cellular mobile network via a Home (e)NodeB Gateway (H(e)NB-GW) 118 and also linked to a Home (e)NodeB management system 120 (H(e)MS), that is the management system for H(e)NBs. In 3GPP 3G networks, HNBs are connected to a Home NodeB Gateway (HNB-GW), which concentrates voice/data and signalling traffic. In the case of 3GPP LTE networks, a HeNB-GW is an optional network element, and HeNBs are connected to a relevant serving gateway for data traffic and to a mobility management entity (MME) for signalling traffic.

The H(e)NB 110 is managed, for example in terms of its configuration, fault, performance, and security management, over a type 1 interface 121. In addition to the type 1 interface 121, a type 2 interface 123 is also present via which the H(e)MS 120 and a network management functionality 150 of a cellular network communicate.

The H(e)NB 110 comprises a user traffic processing part 122 which handles base band processing and otherwise deals with user traffic, an RF module 123 which handles connections with terminal devices, and an OAM part 124 comprising an agent part 126 which is used to set up a connection with a corresponding manager part 127 and configure the H(e)NB for operation, and a fault management part 128.

The management system 120 comprises the manager part 127 which is a counterpart to the agent part 126 of the H(e)NB 110, a fault management part, a configuration management part, and a performance management part.

In operation, the H(e)NB 110 sends and receives two traffic streams. A traffic stream of user traffic and signalling 130 is transmitted between the H(e)NB 110 and the core network 116 and passes through the IP security tunnel 114, the security gateway 112, and the H(e)NB-GW 118. A traffic stream 140 related to OAM is transmitted between the agent part 126 and the manager part 127 of the H(e)MS 120. There are two options for the transmission of OAM traffic 140. It can either pass through the IP (Internet Protocol) security tunnel 114 and the security gateway 112 or, if a network operator considers that there is a secure connection between its OAM functionality and the H(e)NB 110, for example if a DSL line is considered to be secure enough, there is no need to transfer the OAM traffic through the security tunnel 114 and the security gateway 112. However, the security tunnel 114 and the security gateway 112 are mandatory for user traffic and signalling traffic.

For 3G Femto systems, the base station gateway (HNB-GW) 118 is mandatory. It is used to concentrate user traffic and signalling to the processing module 122 which provides functionality comparable to an RNC. For LTE Femto systems, the base station gateway (HeNB-GW) is optional, and signalling traffic is sent to an MME and user data traffic is sent to a serving gateway.

The H(e)MS may be located in, or out of, the system of the mobile network operator which means that the security gateway 112 is optional for OAM.

In one implementation of a Femto system architecture, an application layer protocol for remote management of end-user devices referred to as TR-069 is used between the agent part 126 of the H(e)NB and the manager part 127 of the H(e)MS to support management functionalities. This protocol is concerned with the configuration of DSL and gateway devices. It provides the framework for an efficient DSL broadband infrastructure by providing an internal management system that enacts management commands. Embedded code contains functions that issue those commands. The coded functions consist of methods, parameter values, names, attributes, adding/deleting objects, rebooting, downloads/uploads, forms, etc. It enables easy and secure activation, configuration, and management of customer premise equipment (CPE) from an auto-configuration server (ACS) in the network of a network operator, which communicate in a client-server manner by remote procedure call methods to execute specified procedures using supplied parameters. In the case of TR-069 being used in a Femto system architecture, the CPE corresponds to the H(e)NB and the ACS corresponds to the H(e)MS. While the server is processing a call, the client is blocked; it waits until the server has finished processing before resuming execution. This can permit a DSL service provider to update software and firmware, monitor the status and performance of a connection and carry out diagnostic tests.

The TR-069 protocol is used to provide auto-configuration of various broadband-related devices. It is generally considered to be too complicated a task for average end-users to carry out themselves. It supports, among other things, auto-configuration and dynamic service activation, management of firmware, status and performance control, log-file analysis and dynamic messages, diagnostics, and connectivity and service control. TR-069 is the current standard for activation of DSL-related terminals. It is intended also to be used for Femto base stations operating in 3G and LTE communication systems. Furthermore, it is also applicable to WiMAX Femto base stations and it is expected that it will be also adopted in respect of further implementations of Femto base stations in other types of communications systems.

During use, the H(e)NB 110 may internally generate different types of alarm, caused for example by a call setup failure, a degraded signal, or a power problem. These may include alarms of the following alarm types: Communications Alarm, Processing Error Alarm, Environmental Alarm, Quality of Service Alarm, and Equipment Alarm. Alarms are generated within the H(e)NB and are handled by the fault management part 128 which provides them, via the agent part 126, to the management system 120.

The current 3GPP OAM type 1 interface specification for H(e)NB covers Configuration Management, Fault Management, Performance Management and Security Management. Fault Management of Femto base stations (H(e)NBs) defines four kinds of alarm lists, which have different functions:

1) A Current Alarms List which only keeps open or active alarms which are not yet cleared on the H(e)NB, together with an indicated reporting mechanism, that is logged, queued or expedited. A newly raised alarm event results in a new entry in this list. Any changes to the alarms in this list results in an update event which means that the alarm is updated instead of a new alarm entry being added. A clearing event (a so called "clearing" alarm having the status "cleared" in its severity class) against a corresponding alarm in this list results in the corresponding alarm being removed from this list.

2) A History Alarm List which keeps a record of all of the alarms, together with an indicated reporting mechanism, that is logged, queued or expedited, which have been raised by the H(e)NB. Those alarms may be Raised, Modified, Cleared.

3) An Expedited Alarm List which keeps the alarms, together with an indicated reporting mechanism, in this case expedited, which have been raised by the H(e)NB. These alarms are delivered to the H(e)MS immediately. It means that once an alarm is put into the Expedited Alarm List, if there is a connection to the H(e)MS 120, this alarm will be sent to H(e)MS 120 immediately, and if there is no connection to the H(e)MS 120, the H(e)NB will set up a connection to the H(e)MS and then send out the alarm after the connection has been set up.

4) A Queued Alarm List which keeps the alarms, together with an indicated reporting mechanism, in this case queued, which have been raised by the H(e)NB for each alarm which are waiting to be delivered to the H(e)MS 120 at a later time. It means that the H(e)NB will not set up a connection to the H(e)MS 120 especially for the alarms queued in Queued Alarm List if there is no connection to the H(e)MS 120.

The Alarms Lists are rolling tables, each having a maximum size. As a result, once the number of entries for a particular table reaches the maximum size, the H(e)NB will go back to the oldest entry in the table and overwrite it.

Figure 2:
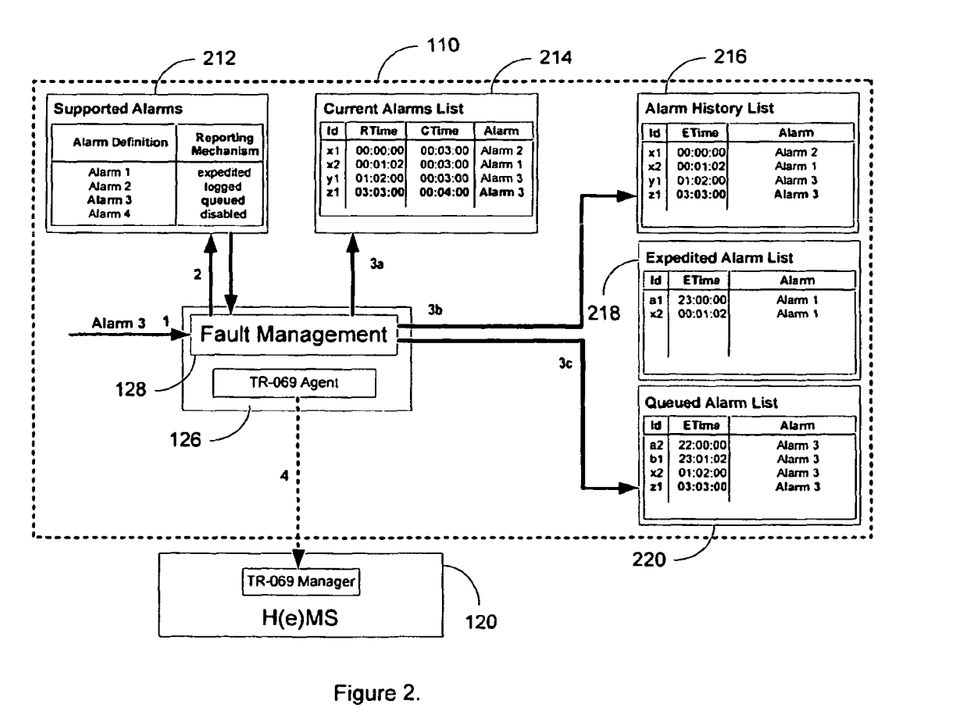
FIG. 2 shows an example of queued alarms and how a Femto cell sends alarms to a management system.

FIG. 2 shows details of alarm management in the H(e)NB 110 and in particular how alarms are handled by the fault management part 128. The OAM part 124 comprises the fault management part 128 and various lists which including a Supported Alarms List 212, a Current Alarms List 214, an Alarm History list 216, an Expedited Alarm List 218, and a Queued Alarm list 220. When the fault management part 128 needs to interact with the H(e)MS 120, for example by notifying it of various alarms, any associated communication is handled by the agent part 126. The agent part 126 is responsible for setting up the connection with the manager part 127 and sending/receiving messages to/from the H(e)MS 120. The fault management part 128 sends alarms to the agent part 126 which forwards them to a fault management application at the H(e)MS 120 via the manager part 127.

An example of the use of Alarm Lists will now be described.

In a first step, an alarm, designated as an alarm of type 3 ("Alarm 3") simply for the purposes of explanation is received by the fault management part 128.

In a second step, the fault management part 128 refers to the Supported Alarm List 212 which contains a list of alarms which the fault management part 128 is able to handle. The Supported Alarm List 212 contains a list of Alarm Definitions (one of which is Alarm 3) cross-referenced with a list of reporting mechanisms. The Alarm Definitions are typically provided via a software/firmware download. As can be seen from FIG. 2, there are alarm definitions of alarm types 1, 2, 3, and 4, and respective reporting mechanisms of "expedited", "logged", "queued", and "disabled". The fault management part 128 takes the received alarm (the Alarm 3) and uses the Supported Alarm List 212 in order to determine the reporting mechanism which in this case is "queued".

Accordingly, in a third step, the fault management part 128 updates the Current Alarm List 214 with information about the Alarm 3 and logs the Alarm 3 in the Alarm History list 216 and the Queued Alarm list 220. In this case, because the alarm definition for the Alarm 3 is "queued" and not "expedited", firstly the information about the Alarm 3 is not provided to the Expedited Alarm List 218 and secondly, assuming there is no extant connection to the H(e)MS 120, the H(e)NB will not set up a connection to the H(e)MS immediately but will transfer information about the Alarm 3 to H(e)MS at a later time once a connection has been set up.

Figure 3:
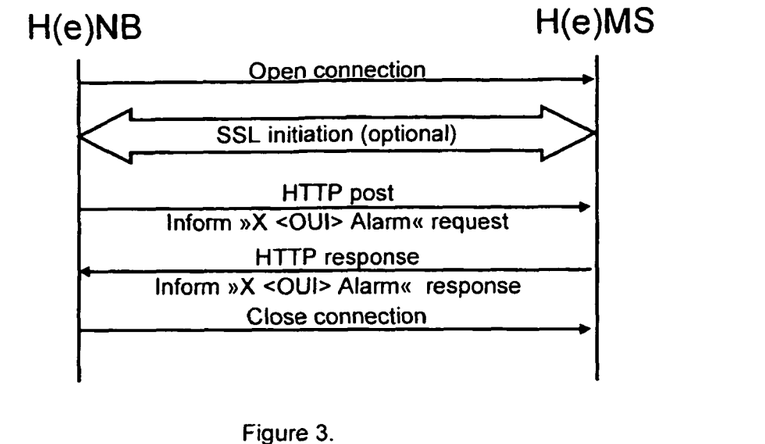
FIG. 3 shows an alarm notification procedure.
Figure 4:
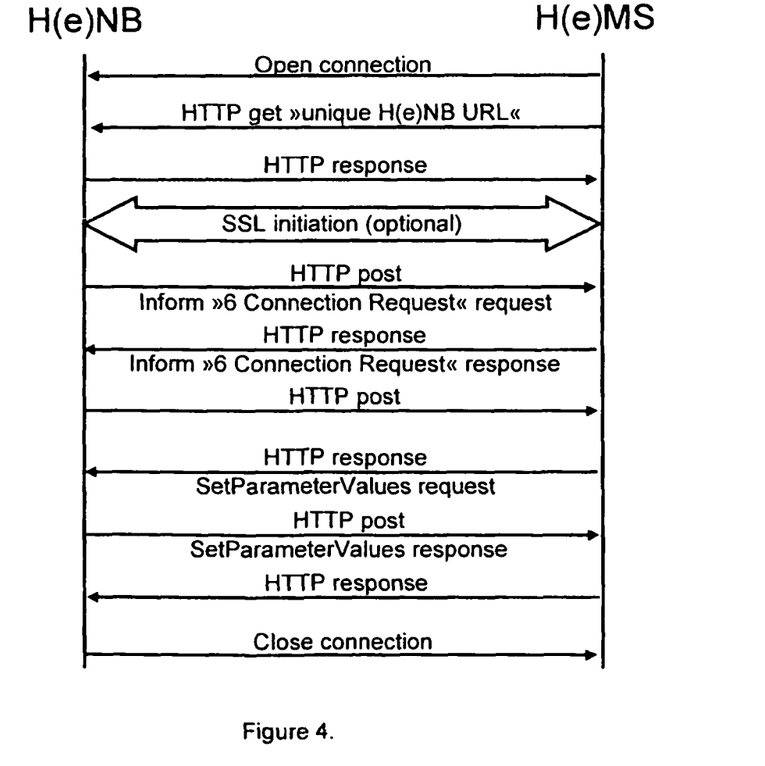
FIG. 4 shows configuration of alarm reporting.

FIGS. 3 and 4 show sequences of message exchange which take place between the H(e)NB and the H(e)MS in order to carry out alarm management. In FIG. 3, alarm notification is shown in the form of a straightforward request/response sequence. In FIG. 4, the configuration of alarm reporting mechanisms is shown. A connection is set up between the H(e)NB and the H(e)MS. The H(e)MS then configures the alarm reporting mechanism to the H(e)NB by using "SetParameterValues Request/Response" messages. Once this has been done, the connection is closed.

It will be understood that if, for example, the fault management part 128 had received an alarm of type 1 (Alarm 1), information about this Alarm 1 would have been added to the Current Alarms list 214, logged in the Alarm History list 216 and added to the Expedited Alarm List 218, and would either have been sent to H(e)MS 120 immediately if there had been a connection to the H(e)MS 120, or if there had been no such connection, the H(e)NB would have specifically set one up and then sent out the information about this Alarm 1 to the H(e)MS.

As can be seen from FIG. 2, there are two other types of alarms, Alarm 2 and Alarm 4. Alarms of type 2 are "logged" which means they are applied to update the Current Alarms list 214 and logged in the Alarm History list 216. Alarms of type 2 are not sent to the H(e)MS. Alarms of type 4 are "disabled" which means that nothing is done, that is no Alarm Lists are updated/modified.

Figure 5:
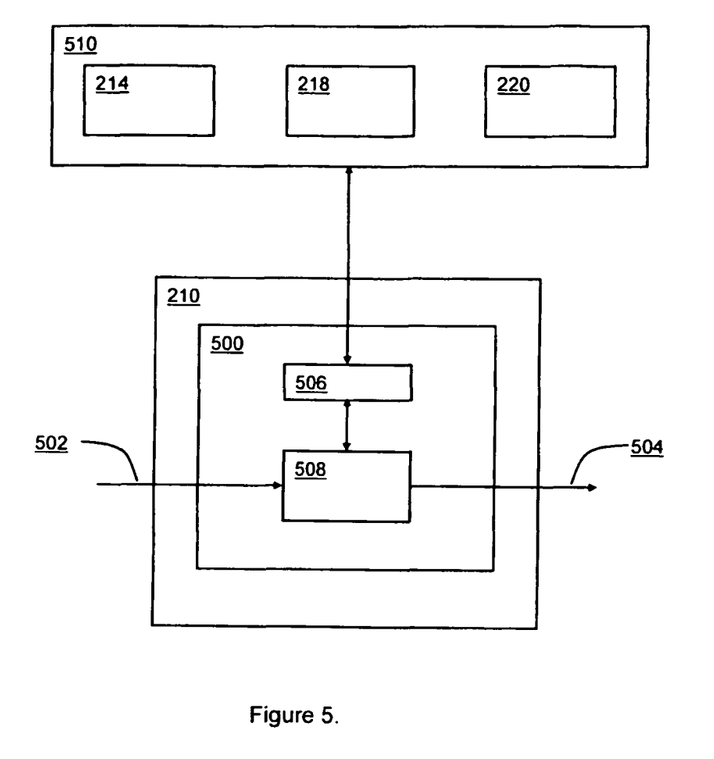
FIG. 5 shows a report generation block.

FIG. 5 shows a report generation block 500. This is a sub-element present in the H(e)NB fault management part 128 and uses various functionality of that part.

The report generation block 500 has an input 502, an output 504, an interface 506, and a report generator 508. The input 502 receives a notification from the agent part 126 that there is a disruption to the communication link between the H(e)NB and its associated H(e)MS and provides this to the report generator 508. When the report generator 508 receives the notification, it responds by establishing connections to various of the Alarm Lists 510 in the H(e)NB 110 via the interface 506 and obtaining information from them which is to be used to generate a report.

The report includes the following information:

a) the number of pending alarms of the Expedited Alarm List 218;

b) the number of pending alarms of the Queued Alarm List 220;

c) the number of alarms of the Current Alarm List 214;

d) in respect of each of the Alarm Lists 214, 218, 220, the number of alarms having a defined grade of severity (for example, the number of alarms identified as being "Critical", the number of alarms identified as being "Major", the number of alarms identified as being "Minor"); and e) the number of overwritten alarms in the Expedited Alarm List 218 and/or the Queued Alarm List 220.

The report generation block 500 carries out periodic interrogations of the Alarm Lists over the period during which the communication link remains down. During this time, the report generation block 500 updates its report.

Receipt of the notification also causes the report generation block 500 to apply a command to the fault management part 128 in order that transfer of Expedited and Queued Alarms are blocked temporarily until the block is removed, although new alarms can still be added to these Alarm Lists during the period when they are blocked. However, the Current Alarm List 214, the Alarm History list 216 will not be blocked. Therefore, once the communication link is re-established, the block being in place means that the fault management part 128, via the agent part 126, will not automatically send a large number of alarms from the Expedited Alarm List 218 and/or the Queued Alarm List 220 to the H(e)MS. In one embodiment of the invention, blocking the transfer of alarms is done before the report is generated.

Once the communication link has been re-established between the H(e)MS and the H(e)NB, this is determined by the agent part 126 which then notifies the report generation block 500. In response, the report generation block 500 freezes updating of the report and provides the frozen report to the agent part 126. The agent part 126 sends the report to the H(e)MS.

Based on the information contained in the report, the H(e)MS 120 carries out alarm synchronisation with the H(e)NB 110 to avoid alarm information inconsistencies or alarm flooding by applying the following rules a), b), and c):

a) In the event that only a modest number, for example ten to twenty, of alarms need to be transferred, the fault management part of the H(e)MS sends an unblock command to the fault management part 128. The unblock command is handled by the agent part 126 which provides it to the fault management part 128 which then unblocks the Expedited Alarm List 218 and/or the Queued Alarm List 220. This may be the case if only a few H(e)NBs are affected, which would be determined by the H(e)MS as a result of receiving only a few reports.

b) In the event that the number of alarms is sufficiently high, for example more than twenty, it is considered that alarm recovery is not useful and the H(e)MS 120 commands the H(e)NB 110 to carry out a reboot or factory reset operation. As a result only a single H(e)NB 110 may be rebooted or reset or a number of H(e)NBs 110 may be with each receiving its own individual command. A reboot or a factory reset operation also unblocks the Expedited Alarm List 218 and the Queued Alarm List 220. A reboot operation deletes all of the alarms except alarms in the Alarm History list 216. A factory reset operation deletes all of the alarms. If the H(e)MS 120 decides to instruct an H(e)NB 110 to carry out a reboot or a reset operation, it also resets the alarm status of all unresolved alarms it maintains in respect of that H(e)NB 110. A factory reset or reboot operation also causes the alarm status in the H(e)MS 120 and other management systems such as network management functionality 150 to be reset. It also puts the Alarm Lists into an unblocked state.

c) In the event that it is considered that the number of alarms is not too high to handle, but there needs to be some control in transferring only the alarms which are considered to be active, a synchronisation of alarms is carried out between the H(e)NB 110 and the H(e)MS 120. This is done by the H(e)MS 120 obtaining a list of the active alarms within the H(e)NB 110 and then ensuring that it handles only these alarms rather than spend transmission resources and processing resources on alarms which do not have to be processed.

In one embodiment of the invention, the H(e)MS 120 instructs the H(e)NB 110 to send to it synchronisation information which will enable it to carry out the synchronisation operation. In this case, the synchronisation information is a complete record of the alarms which are still open on the H(e)NB 110. In this embodiment of the invention, this is the Current Alarm List 214 and it is obtained by the H(e)MS using a GET command, particularly indicated as a synchronisation GET command, which it sends to the H(e)NB 110. The H(e)NB also receives, or obtains, an associated synchronisation time-stamp which represents the time to be used as the basis of synchronisation. This may be generated in the H(e)MS 120 and sent to the H(e)NB 110 or generated in the H(e)NB 110 as a result of receiving the synchronisation GET command. In response to the synchronisation GET command, the H(e)NB 110 provides to the H(e)MS 120 the Current Alarm List 214 in accordance with the synchronisation time-stamp, for example sent at the time specified in the time-stamp or having a state which the Current Alarm List 214 had at that time. In addition, the H(e)NB 110 takes the synchronisation GET command as a command that it is not to send to the H(e)MS 120 the alarms in the Expedited Alarm List 218 and the Queued Alarm List 220 that have individual time-stamps earlier than the synchronisation time-stamp. However, the H(e)NB 110 is configured to send alarms from the Expedited Alarm List 218 or the Queued Alarm list 220 to the H(e)MS 120 having individual time-stamps later than the synchronisation time-stamp when these lists are unblocked.

Once the Current Alarm List 214 and synchronisation time-stamp has been sent to the H(e)MS 120, various synchronisation activities can be performed as will now be described.

In the H(e)NB 110, it is not necessary to send open alarms having individual time-stamps which are prior to the synchronisation time-stamp because any such pre-existing alarms will either be open alarms which are present in the Current Alarm List 214 or closed alarms which are not present on the Current Alarm List 214 and do not need to be processed. Therefore, the pre-existing alarms in the Expedited and Queued Alarm Lists will not be sent to the H(e)MS 120 after it has instructed the fault management part 128 to unblock both Alarm Lists.

This minimises the transfer of alarm information to the H(e)MS 120 is by avoiding transfer of already cleared alarms. For example, alarms which were added to the Expedited Alarm List 218 or the Queued Alarm List 220 during the blocking period and consequently were not transferred to the H(e)MS, 120, referred to as "non-sent alarms", may have been cleared in the Current Alarm List 214 during the blocking period. As a result, although they are present in either the Expedited Alarm List 218 or the Queued Alarm List 220, they do not need to be transferred to the H(e)MS 120 on unblocking. Therefore, once the Current Alarm List 214 has been sent to the H(e)MS 120, alarms in the Expedited Alarm List 218 and the Queued Alarm list 220 having individual time-stamps earlier than the synchronisation time-stamp are marked as sent although in reality are not sent. However, later alarms will be handled in the usual manner and sent to the H(e)MS 120.

Once the H(e)MS 120 has the Current Alarm List 214, it can be used to deal with overwritten alarms. During the period that the communication link is down, the Expedited Alarm List 218 and the Queued Alarm list 220 are blocked. However, they continue to receive new alarms. If the H(e)MS 120 recognises from the report that a sufficiently large number of alarms have been generated (which may be the case if the link is down for a sufficiently long time) then there might have been overwriting of alarms in the Expedited Alarm List 218 and/or the Queued Alarm list 220 in which newer alarms might have overwritten older alarms. This can cause two problems. The first problem occurs when an alarm which was in the Expedited Alarm-List 218 or the Queued Alarm list 220 is transmitted to the H(e)MS 120 before the communication link goes down. If a "clearing" alarm is generated after the communication link goes down and the "clearing" alarm gets overwritten before the communication link is restored and the Alarm Lists are unblocked, the H(e)NB 110 is then not able to send the "clearing" alarm to the H(e)MS 120 which then does not clear the active alarm in the H(e)MS 120. The second problem occurs when an alarm in the Expedited Alarm List 218 or the Queued Alarm list 220 which is still active is overwritten so that when the communication link is restored and the Alarm Lists are unblocked, the H(e)MS 120 is not notified of its existence and so cannot take any steps to resolve it.

In order to deal with the first problem the H(e)MS 120 uses the Current Alarm List 214 to compare the alarms on the list with the alarms it is currently handling and is thus able to identify alarms which are still active in the H(e)MS 120, that is no "clearing" alarm has been received, but have been cleared in the H(e)NB 110, that is they are not present in the Current Alarm List 214. The H(e)MS 120 is then able to clear these alarms within itself, for example by generating and using a suitable "clearing" alarm. Furthermore, having re-constructed "clearing" alarms which were overwritten in the H(e)NB 110, the H(e)MS 120 is thus able to provide them to higher level management systems which had previously been notified of alarms that they have in fact been cleared.

Therefore, the procedure is that once a communication link is restored, before the alarm lists are unblocked, the report is sent to, and checked by, the H(e)MS 120. Synchronisation is then applied which may take a basic form based on a reboot or a factory reset, or a more complicated form involving the H(e)MS 120 obtaining synchronisation information. The necessary synchronisation operation takes place and then the Expedited Alarm List 218 and the Queued Alarm list 220 are unblocked and alarms can be sent to the H(e)MS 120.

It should be noted from the foregoing that the fault management of the H(e)NB 110 applies blocking and the fault management of the H(e)MS 120 applies unblocking.

The rules a), b), and c) can be applied individually or in combination. For example the rules a) and b) can be used in combination with a) applying below a threshold and b) applying above the threshold. The rule c) can be applied independently or in conjunction with the rule a).

As is explained in the foregoing, synchronisation according to c) may be applied to mitigate the effect of overwriting of alarms in the Expedited Alarm List 218 and the Queued Alarm list 220. It will be understood that if the report contains fewer reports than a threshold, it can be assumed there has been no overwriting, and it is not necessary to apply rule c). In this case, the Expedited Alarm List 218 and the Queued Alarm list 220 are unblocked and the alarms within are sent to the H(e)MS according to rule a).

Accordingly, the H(e)MS is able to optimise the synchronisation traffic for alarm management after a communication problem.

In another embodiment of the invention, a simple approach is applied and the number and type of alarms is ignored and a reboot command is always sent to the H(e)NB to reset it and also to delete all alarms.

In another embodiment of the invention, a simplified report is prepared and sent containing only the total number of alarms which have not been sent. The H(e)MS can react to this kind of report by unblocking alarm transfer if the total number of alarms is less than a threshold or sending a reboot command if the total number of alarms is more than a threshold. In one embodiment, the threshold is twenty alarms.

In one embodiment of the invention, there is an implicit "unblocking" command which is automatically applied as a result of carrying out a reboot operation, a factory reset operation, or an alarm status synchronisation operation.

In another embodiment of the invention, there is an explicit "unblocking" command which is sent and applied after a reboot operation, a factory reset operation, or an alarm status synchronisation operation.

Although in the foregoing, the number of pending alarms in the Expedited/Queued/Current Alarm Lists is used to generate the report, in another embodiment, it is the buffer utilisation percentage of the Expedited/Queued/Current Alarm Lists which is used.

The invention has been described in relation to Femto applications in 3GPP systems but the idea is not limited to 3GPP and it can be used in relation to other Femto applications, for example in WiMAX systems.

Although the term "home" is used in the foregoing, it should be recognised that the invention can be applied to non-home environments such as offices.

While preferred embodiments of the invention have been shown and described, it will be understood that such embodiments are described by way of example only. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A method of alarm management in a communications system performed by a node, the method of alarm management comprising the steps of: detecting disruption of a communication link between a node and a management system due to a communication link failure; blocking the sending of alarms by the node; generating a report representative of an accumulation of alarms, wherein the report is periodically updated over the time period of the communication disruption; detecting re-establishment of the communication link; and sending the report to the management system upon the re-establishment of the communication link; wherein the alarms are reported to the management system on the basis of the report, wherein the management system carries out alarm synchronization with the node to avoid alarm information inconsistencies.

2. A method according to claim 1 in which the node comprises a Femto base station.

3. A method according to claim 1 in which the alarms are generated when the node detects a problem and then generates a corresponding internal indication.

4. A method according to claim 1 in which the node puts the alarms into alarm lists.

5. A method according to claim 4 in which after the communication link is re-established, the node sends at least some alarms that have been stored in the alarm lists during the period that the communication link was disrupted.

6. A method according to claim 1 in which the report includes information relating to a number of pending alarms which are indicated as needing to be sent to the management system.

7. A method according to claim 1 in which a fault management functionality of the node applies blocking if the communication link is disrupted.

8. A method according to claim 1 in which blocking involves application of a command to block temporarily transfer of expedited and queued alarms until the block is removed.

9. A method according to claim 1 in which blocking is applied by the node.

10. A method according to claim 1 in which during blocking a list of current alarms remains unblocked.

11. A method according to claim 1 in which unblocking is applied by the management system.

12. A method according to claim 1 in which the management system uses a synchronisation command to obtain from the node a list of current alarms.

13. A method of alarm management in a communications system performed by a node, the method of alarm management comprising the steps of:
- detecting disruption of a communication link between a node and a management system via which alarms are communicated;
- blocking the sending of alarms by the node;
- generating a report representative of an accumulation of alarms;
- detecting re-establishment of the communication link; and
- sending the report to the management system;
- wherein the alarms are reported to the management system on the basis of the report,
- wherein the management system carries out alarm synchronization with the node to avoid alarm information inconsistencies or alarm flooding,
- wherein the node puts the alarms into alarm lists, and
- wherein the report is generated in a report generation block which receives a notification that there is a disruption to the communication link and responds by establishing connections to various alarm lists in the node and obtaining from them information which is to be used to generate the report.

14. A method of alarm management in a communications system performed by a node, the method of alarm management comprising the steps of:
- detecting disruption of a communication link between a node and a management system via which alarms are communicated;
- blocking the sending of alarms by the node;
- generating a report representative of an accumulation of alarms;
- detecting re-establishment of the communication link; and
- sending the report to the management system;
- wherein the alarms are reported to the management system on the basis of the report,
- wherein the management system carries out alarm synchronization with the node to avoid alarm information inconsistencies or alarm flooding, and
- wherein after re-establishment of the communication link, the management system synchronises alarms with the node by carrying out at least one of the following: sending pending alarms to the management system if it is determined that there is a sufficiently small number of alarms to be reported, resetting the node if it is determined that there is too large a number of alarms to be reported, and re-constructing overwritten alarms.

15. A communications system capable of managing alarms, the system comprising: a node being able to communicating alarms to a management system, determining by the node failure to communicate the alarms to the management system due to a disruption of the communication link, and being capable of blocking the sending of alarms, the node comprising a report generating block to generate a report representative of an accumulation of alarms, wherein the report is periodically updated over the time period of the communication disruption, the node being capable of sending the report to the management system when it has determined that there is no longer disruption of the communication link, wherein the alarms are reported to the management system based on the report, wherein the management system carries out alarm synchronization with the node to avoid alarm information inconsistencies.

16. A node capable of managing alarms in a communications system, the node being able to communicate alarms to a management system, the node being capable of determining failure to communicate the alarms to the management system due to a disruption of the communication link, and being capable of blocking the sending of alarms, the node comprising a report generating block to generate a report representative of an accumulation of alarms, wherein the report is periodically updated over the time period of the communication disruption, when it has determined that there is no longer disruption of the communication link, the node being capable of sending the report to the management system, wherein reporting alarms to the management system is carried out based on the report, wherein the management system carries out alarm synchronization with the node to avoid alarm information inconsistencies.

17. A computer program embodied on a non-transitory computer-readable medium, said computer program comprising software code that when executed on a computing system performs a method of alarm management in a communications system comprising the steps of: detecting by the node failure to communicate alarms to a management system due to a disruption of a communication link between a node and a management system; blocking the sending of alarms by the node; generating a report representative of an accumulation of alarms, wherein the report is periodically updated over the time period of the communication disruption; detecting re-establishment of the communication link; sending the report to the management system upon the re-establishment of the communication link; and reporting alarms to the management system on the basis of the report, wherein the management system carries out alarm synchronization with the node to avoid alarm information inconsistencies.

18. A computer program according to claim 17 having executable code portions which are capable of carrying out the steps of the method.

* * * * *